United States Patent Office
2,848,324
Patented Aug. 19, 1958

2,848,324

METHOD OF PRODUCING AGGLOMERATES HIGHLY RESISTANT AGAINST HEAT AND/OR CHEMICAL ATTACK

Siegfried Krapf, Nurnberg, Germany

No Drawing. Application April 30, 1954
Serial No. 426,930

7 Claims. (Cl. 75—206)

The present invention relates to an improved process for the production of materials which are highly resistant against heat and/or chemical attack, and more particularly relates to an improved process wherein such materials are formed as agglomerates by self propagating exothermic reaction under controlled conditions which prevent substantial segregation of the reaction products.

Previously special alloy steels, sintered metals, or "cermets" (mixtures of ceramics and metals) have primarily been employed for such purposes. It has also been proposed to produce such materials with the aid of exothermic reactions by forming compressed compacts of the finely divided reactants and igniting such compacts to initiate the self propagating exothermic reaction. Experience has however, shown that the latter procedure leads to unsatisfactory results as the interior of the resultant products unavoidably contain fissures and cracks.

It has unexpectedly been found that agglomerated materials highly resistant to heat and/or chemical attack which do not contain cracks or fissures, can be satisfactorily produced from mixtures of finely divided reactants capable of undergoing a controlled self propagating exothermic reaction, if such mixtures are ignited in an uncompacted or loose state and permitted to undergo a controlled self propagating exothermic reaction. The desired uncompacted state of the reaction mixture when undergoing the exothermic reaction, can be achieved either by spraying, pouring or dropping the pulverized reaction mixture into a mold or onto a base, and igniting the reaction mixture to initiate the exothermic reaction or by spraying or dropping the pulverized reaction mixture in a base or mold, which has been initially heated, at least at the point of impingement to a temperature sufficiently high to initiate the exothermic reaction of the reaction mixture initially impinging thereagainst, which exothermic reaction then continues with the subsequently impinging reaction mixture particles, in view of the self propagating nature of the reaction, so as to render further ignition for external source, unnecessary.

The necessary control of the exothermic reaction to ensure that substantial segregation of the reaction products does not occur, can be effected in a number of ways. The speed of reaction, as well as the heat produced during the reaction, can for example, be controlled by the grain size of the reactants, as well as by the addition of inert diluents, if the reaction tends to react too rapidly and produce too high a temperature, or by the addition of catalysts, in the event that the reactants are of such a nature that the reaction is difficult to initiate, or is too sluggish to be self propagating. Furthermore, the course of the exothermic reaction can be controlled by regulating the quantity of the reaction mixture available at a given time for the exothermic reaction, for example, the quantity of loose powdered reaction mixture placed in a mold before ignition can be varied or when the reaction mixture is sprayed or dropped upon a base where it is ignited, the course of the continuing reaction can be controlled by regulating the quantity and location of reaction mixture impinging against the reaction mixture. In general, it has been found that when larger quantities of reactants are placed within a mold before the exothermic action is initiated, greater control of the reaction is required than when the reaction mixture is gradually sprayed or dropped into a mold against a point of ignition. For example, in the production of agglomerates, by reacting equivalent quantities of $Cr_2O_3$ and Mg to produce agglomerate containing C+MgO according to the following equation:

$$Cr_2O_3 + 3Mg \rightarrow 2Cr + 3MgO$$

it was found advisable that the reaction mixture contains about 60% of an inert diluent for example, $ZrO_2$, MgO and/or $Cr_2O_3$ when the reaction mixture is placed in a mold before ignition. On the other hand, if the mixture is gradually sprayed into the mold against a point of ignition it is possible to employ a reaction mixture containing only about 10% of inert diluent without danger of obtaining segregation in the agglomerate produced.

The character of the agglomerates which can be produced according to the invention depends upon the composition of the reaction mixture employed, as well as the conditions employed for the reaction. The agglomerated products can, for example, be completely metallic, mixtures of a metal or metals with products of ceramic nature, or be mixtures of purely ceramic materials. For instance, if the reaction mixture consists of (1) $Cr_2O_3+2Al$, the agglomerate produced will contain $2Cr+Al_2O_3$. (2) $2CrO_3+2Al$ the agglomerate produced will contain $Cr_2O_3+Al_2O_3$. (3) $3CrO_3+4Al$, the agglomerate produced will contain $$Cr_2O_3+2Al_2O_3+Cr$$

It has also been found that when the exothermic reaction is carried out under a high vacuum, for example, about 1 Torr, that the agglomerates produced are of greater density than agglomerates produced at atmospheric pressures. It has also been found advantageous, where agglomerates of extremely high density are desired, to subject the agglomerates immediately after completion of the exothermic reaction by which they are produced, to compacting pressure, such as, several hundred kilograms, for example, about 300 kilograms per square centimeter. The application of such pressure is of course effected while the agglomerate still is hot enough to permit plastic flow under the pressures applied. When the spraying technique is employed, it has been found advantageous that the sprayed reaction mixture impinge upon the base where it reacts with high velocity.

As indicated above, the reaction mixture employed, that is, both the reactants and any inert diluents or catalysts added, is finely powdered and preferably is of a uniform grain size up to 0.1 mm. in diameter.

When the exothermic reactions are not carried out under high vacuum, it is preferable that they be carried out under an inert atmosphere, particularly when a procedure is employed wherein the reaction mixture is gradually sprayed or dropped upon a base where it is to be ignited, in order to avoid premature reactions involving the reaction components, and ensure that the reactants only react with each other after they have impinged upon the base where they are to react and agglomerate.

In some instances where the reactants are such that it is difficult to initiate the desired exothermic reaction, it can be advisable to introduce substances which act catalytically; for example in reactions involving aluminum the initiation of the reaction can be catalysed by the addition of small quantities of iodine or mercury chloride, for example, about 2% by weight with reference to the aluminum.

The reaction mixtures employed can be of most varied sort, as long as they are capable of undergoing a controlled self propagating exothermic reaction to produce an agglomerate in which substantially no segregation of the reaction products occurs. The reactions involved can for example, be oxidations, reductions and decompositions, which are self propagating and exothermic in nature. Preferably, the reactants are mixtures of metals and metal compounds, preferably the oxides, which react exothermically. However, other reactant mixtures such as mixtures of metals or metal compounds with carbon or silicon can also be employed provided they react exothermically. Also when the spraying technique is employed, the composition of the reaction mixture can be altered during the spraying, so that layers of different characteristic properties can be deposited. The process according to the invention is particularly adapted to reaction mixtures involving chromium oxides and metals such as, aluminum and magnesium.

The initial ignition of the exothermic reaction mixture can be effected by any known means, whereby the reaction mixture is brought to ignition temperatures such as are customarily employed for thermite mixture. For example, the initial ignition can be effected electrically, for instance, with an incandescent wire, or an electric arc or with the aid of ignition mixtures such as, barium peroxide and magnesium.

The following examples will serve to illustrate several embodiments of the process according to the invention.

*Example 1*

A thick spray of a mixture of finely pulverized aluminum and chromium oxide, in equivalent quantities propelled by an inert gas such as, nitrogen, was directed against a base which was heated at the impinging point to the temperature necessary to initiate the exothermic self propagating reaction between the aluminum and chromium oxide. The inert gas maintained a sufficiently inert atmosphere to prevent premature oxidation of the aluminum before impingement upon the base where the desired reaction took place. An agglomerate was obtained which was composed of alumina+metallic chromium, which were homogeneously distributed therein. The agglomerate was resistant to heat of more than 1900° C. and was suitable for gas turbine blades. When the spraying of the reaction mixture was carried out under a vacuum of about 1 Torr a similar, but denser product was obtained. One Torr is the pressure of one millimeter of mercury on one square centimeter. When the spraying was carried out under vacuum, it was accomplished with the aid of a turbine which projected the powdered mixture without the necessity of using a propellent gas.

The reaction involved is represented by the following equation:

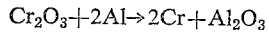

$$Cr_2O_3 + 2Al \rightarrow 2Cr + Al_2O_3$$

As such reaction is sometimes difficult to initiate it can be desirable to mix about 2% of finely pulverized iodine based upon the aluminum powder with the reaction mixture.

*Example 2*

A mixture of equivalent quantities of finely pulverized aluminum and iron oxide, with 10% by weight of finely powdered alumina added, was gradually dropped under a high vacuum of about 1 Torr upon a base which was initially heated at the point of impingement to a temperature sufficient to initiate the self propagating reaction between the iron oxide and aluminum. Care was taken to loosen the powder introduced into the high vacuum by passing it through rotating blades before it dropped upon the base where it was ignited. The agglomerate produced was substantially uniform with no segregation of slags or metal regulus. If on the other hand, the alumina was omitted from the reaction mixture an iron melt is produced upon which alumina slags float.

*Example 3*

A mixture containing equimolecular quantities of chromic acid anhydride and aluminum and in addition 60% of alumina was finely pulverized to a grain size below .1 mm. in diameter and dropped loosely in a mold and ignited. A substantially homogeneous agglomerate composed of chromium oxide and alumina resulted. Similar results were obtained when the alumina employed to control the exothermic reaction was replaced by chromium oxide or a mixture of chromium oxide and alumina. Substantially satisfactory results were also obtained with additions of the inert controlling agent or agents ranging from about 35 to about 70%. Smaller quantities tended to lead to an explosive course of reaction, whereas larger quantities made the reaction too sluggish to propagate itself satisfactorily. Compression of the reaction mixture immediately after completion of the exothermic reaction at a pressure of about 300 kilograms per cm.² lead to an extremely dense product.

*Example 4*

A finely pulverized mixture composed of chromic acid anhydride and aluminum in a proportion of 4 moles of chromic anhydride to 6 moles of aluminum and 20% of alumina was dropped into a mold and ignited. A substantially uniform agglomerate composed of chromium oxide and alumina resulted. As in Example 3, the alumina can be replaced by chromium oxide or mixtures thereof with alumina.

*Example 5*

A finely pulverized mixture of one mole of chromium oxide to 3 moles of magnesium and 70% of magnesium oxide was placed in a mold and ignited. Substantially homogeneous agglomerate composed of chromium and magnesium oxide resulted. When the proportion of chromium oxide in the reaction mixture was raised slightly, a similar product, which in addition contained residual $Cr_2O_3$, was obtained.

*Example 6*

A finely pulverized mixture of iron oxide ($Fe_2O_3$) chromium oxide, and aluminum in a molecular proportion of 1:1:4 containing 30% by weight of $Al_2O_3$ as an inert diluent was dropped into a mold and ignited. A substantially homogeneous agglomerate composed of an alloy of iron and chromium and aluminum oxide was obtained.

*Example 7*

A finely pulverized mixture of 1000 g. $CrO_3$, 360 g. Mg and 2400 g. $ZrO_2$ was dropped in a mold and ignited whereby a substantially uniform agglomerate composed of chromium oxide, magnesium oxide and zirconium oxide was obtained. A denser stone like product was obtained when the reaction mixture was pressed at a pressure of several hundred kilograms per square centimeter immediately following completion of the exothermic reaction.

The agglomerates which are obtained by the process according to the invention, as has already been indicated, are of substantially homogeneous nature with no segregation of the components. In other words, the distribution of the solid components depends substantially upon the composition and powdered nature of the reactants employed for the exothermic reaction. Generally, the products resemble sintered products as the cohesion between the particles primarily is effected by diffusion phenomena rather than fusion. In some instances the exothermic reaction temperature may be such that one of the reaction products may fuse, but segregation of the fused grains is prevented by the presence of sufficient quantities of grains of unfused reaction products or diluents.

The agglomerates obtained by the process according to the invention are useful for a number of different purposes depending upon their structure and composition. They are exceptionally suitable for use where high temperature resistance and/or resistance to chemical attack are desired and can for example, be employed as electrical resistance, or electrical heating elements.

This application is a continuation-in-part of application Serial No. 253,653, filed October 29, 1951, now abandoned.

I claim:

1. In a process for the production of a molded article comprising a homogeneous agglomerate of metal and metal oxide free of slag and regulus, the steps of: introducing an uncompacted finely divided reaction mixture into a mold, the mixture containing at least one pulverized metal and at least one pulverized metal oxide capable of undergoing with each other a nonexplosive self-propagating exothermic reaction, the reaction being of such speed and intensity that no substantial segregation of the metal-containing reaction products occurs; igniting the uncompacted mixture to initiate the exothermic reaction; permitting the reaction to proceed to completion; and subjecting the reacted mixture to a pressure in the order of several hundred kilograms per square centimeter while the mixture is hot to compact the mixture and form it into the mold.

2. A process as defined in claim 1 in which the ignition and reaction are carried out under a high vacuum in the order of one Torr.

3. A process as defined in claim 1 in which the reaction mixture comprises at least one oxide of chromium and metallic aluminum.

4. A process as defined in claim 1 in which the reaction mixture comprises at least one oxide of chromium and metallic magnesium.

5. A process as defined in claim 1 in which the reaction mixture contains a quantity of a material which does not take part in the reaction for reducing the speed and intensity of the exothermic reaction.

6. A process as defined in claim 5 in which the non-participating material is one of the reaction products.

7. A process as defined in claim 1 including the steps of: impinging a quantity of the uncompacted finely divided reaction mixture into the mold; igniting the mixture as it strikes the mold; and impinging further quantities of the mixture into the mold, continuing the reaction until the entire mixture is reacted.

References Cited in the file of this patent

UNITED STATES PATENTS

| | | |
|---|---|---|
| 968,350 | Harrison | Aug. 23, 1910 |
| 1,705,655 | Becket | Mar. 19, 1929 |
| 2,097,502 | Southgate | Nov. 2, 1937 |
| 2,281,216 | Udy | Apr. 29, 1942 |
| 2,672,426 | Grubel et al. | Mar. 16, 1954 |
| 2,698,990 | Conant et al. | Jan. 11, 1955 |

FOREIGN PATENTS

| | | |
|---|---|---|
| 268,241 | Switzerland | Aug. 16, 1950 |

OTHER REFERENCES

American Foundryman, August 1946, pages 71–76, Lutts et al.

---

UNITED STATES PATENT OFFICE

CERTIFICATE OF CORRECTION

Patent No. 2,848,324                      August 19, 1958

Siegfried Krapf

It is hereby certified that error appears in the printed specification of the above numbered patent requiring correction and that the said Letters Patent should read as corrected below.

Column 2, line 12, for "agglomerate containing C+ MgO" read -- agglomerates containing Cr+ MgO --.

Signed and sealed this 28th day of October 1958.

(SEAL)
Attest:

KARL H. AXLINE
Attesting Officer

ROBERT C. WATSON
Commissioner of Patents

UNITED STATES PATENT OFFICE
CERTIFICATE OF CORRECTION

Patent No. 2,848,324                                                  August 19, 1958

Siegfried Krapf

It is hereby certified that error appears in the printed specification of the above numbered patent requiring correction and that the said Letters Patent should read as corrected below.

Column 2, line 12, for "agglomerate containing C+ MgO" read -- agglomerates containing Cr+ MgO --.

Signed and sealed this 28th day of October 1958.

(SEAL)
Attest:

KARL H. AXLINE                                                      ROBERT C. WATSON
Attesting Officer                                              Commissioner of Patents